(12) United States Patent
Jablon

(10) Patent No.: US 6,310,127 B1
(45) Date of Patent: Oct. 30, 2001

(54) COATING COMPOSITIONS CONTAINING ETHYLENE-ACRYLIC ACID COPOLYMERS WITH POLYAMIDE GRAFTS AS RHEOLOGY MODIFIERS

(75) Inventor: Michael Jablon, Elizabeth, NJ (US)

(73) Assignee: AlliedSignal Inc., Morris Township, NJ (US)

( * ) Notice: Subject to any disclaimer, the term of this patent is extended or adjusted under 35 U.S.C. 154(b) by 0 days.

(21) Appl. No.: 08/572,193

(22) Filed: Dec. 14, 1995

Related U.S. Application Data

(63) Continuation of application No. 08/441,718, filed on May 15, 1995, now abandoned, which is a continuation of application No. 08/088,461, filed on Jul. 7, 1993, now abandoned.

(51) Int. Cl.$^7$ ........................................ C08K 5/04
(52) U.S. Cl. .................. 524/364; 524/361; 524/365; 524/504; 524/538; 525/183
(58) Field of Search ................... 524/361, 364, 524/365, 504, 538; 525/138

(56) References Cited

U.S. PATENT DOCUMENTS

| | | |
|---|---|---|
| 4,012,461 | 3/1977 | van Brederode . |
| 4,117,038 | 9/1978 | Lehmann et al. . |
| 4,198,327 | 4/1980 | Matsumoto et al. . |
| 4,327,248 | 4/1982 | Campbell . |
| 4,416,944 | 11/1983 | Adur . |
| 4,537,836 | 8/1985 | Adur et al. . |
| 4,671,986 | 6/1987 | Clementini et al. . |
| 4,749,727 | 6/1988 | Tsuchiya . |
| 4,775,713 | 10/1988 | Homma et al. . |
| 4,802,886 | 2/1989 | Boocock . |
| 5,130,372 | * 7/1992 | Lences et al. ........................ 525/183 |
| 5,140,059 | * 8/1992 | Simoens et al. ..................... 524/504 |
| 5,160,475 | * 11/1992 | Asano et al. ..................... 525/183 X |
| 5,212,238 | * 5/1993 | Scheibelhoffer et al. ............. 525/66 |
| 5,214,090 | * 5/1993 | Moriyama ....................... 524/504 X |
| 5,342,894 | * 8/1994 | Robeson et al. ..................... 525/183 |
| 5,352,741 | * 10/1994 | Dierickx et al. ..................... 525/183 |

FOREIGN PATENT DOCUMENTS

| | | |
|---|---|---|
| A0363698 | 4/1990 | (EP) . |
| A0541477 | 5/1993 | (EP) . |
| A2262939 | 7/1993 | (GB) . |
| A8907961 | 3/1989 | (WO) . |
| A9417127 | 8/1994 | (WO) . |

* cited by examiner

*Primary Examiner*—Judy M. Reddick
(74) *Attorney, Agent, or Firm*—Colleen Szuch

(57) ABSTRACT

An improved coating composition having one or more polymeric binders dispersed in a liquid medium, wherein the improvement comprises an anti-sag and anti-settling effective amount of a copolymer comprising a polymeric backbone comprising recurring monomeric units derived from monomers selected from the group consisting of one or more α-olefins and one or more unsaturated carboxylic acids, said backbone having grafted thereto, by a covalent amide linkage, one or more polymeric grafts comprising at least one recurring monomeric unit selected from the group consisting of: —NHC(O)RC(O)NHR$_1$ and —NH—R—C(O)— or a combination thereof, wherein R is an alkylene group of at least about 2 carbon atoms, and R$_1$ is R or aryl.

24 Claims, No Drawings

COATING COMPOSITIONS CONTAINING ETHYLENE-ACRYLIC ACID COPOLYMERS WITH POLYAMIDE GRAFTS AS RHEOLOGY MODIFIERS

This application is continuation of application Ser. No. 08/441,718 filed May 15, 1995 now abandoned which is a File Wrapper Continuation of Ser. No. 08/088,461 filed on Jul. 7, 1993 now abandoned.

BACKGROUND OF THE INVENTION

1. Field of the Invention

This invention relates to improved coating compositions. More particularly, the present invention relates to rheological additives for coating compositions. Even more particularly, the present invention relates to thixotropic additives which control sag, levelling and pigment suspension in a coating composition. The rheological additives of the present invention are copolymers having a backbone of recurring α-olefin and carboxylic acid monomeric units, having grafted thereto one or more polymeric grafts with the following recurring monomeric units:

—NHC(O)RC(O)NHR$_1$ and—NH—R—C(O)— or a combination thereof, wherein R is an alkylene group of at least about 2 carbon atoms, and R$_1$ is R or aryl.

2. Description of Related Art

In the formulation of coatings, it is well known that rheological modifiers may be added to control the flow properties of the final product for a particular application. A large number of rheological additives are available to control properties of a coating formulation during storage, transportation, processing, application, and post-application to a particular surface. These additives include modified and unmodified organic clays, and a large variety of organic compounds, as set forth, for example, in *Rheology Handbook,* Rheox, Inc., Hightstown, N.J. 1991.

The control of sag, levelling and pigment suspension in a coating formulation requires additives which maintain viscosity of the coating at a variety of shear rates. This is difficult, since control of these properties involves opposing phenomena. For example, total freedom from sag requires a coating with extremely high viscosities during application; however, the low flow rate of such a material means that the coating may not flow out completely to form a smooth film. The development of an enveloping rheological structure to control pigment suspension during storage may result in coating which exhibits levelling problems during application.

To maintain viscosity under these diverse conditions, the prior art has suggested incorporation of additives to control pigment suspension, such as surfactants and thickeners, along with additional additives intended to control levelling and sag, such as organic clays. However, production of a coating with such multiple additives is a difficult and complex procedure, sometimes requiring separate processing conditions for each rheological additive. A correct balance of properties must also be achieved among the various additives. In the prior art, even processing parameters of single rheological additives have proven quite difficult to control. If these precise formulation requirements are not employed, coatings with inconsistent properties may be produced. These precise formulations are also difficult to manufacture on a large scale, and require maintenance of a large variety of additive products.

The rheological modifier utilized in the improved coating composition of the present invention performs the functions of both an anti-sag additive and an anti-settling additive. In addition, the process of producing the coating composition of the present invention does not require the multiple formulation steps or precise parameter control necessary to compound the coatings of the prior art.

SUMMARY OF THE INVENTION

The present invention is an improved coating composition. In addition to the polymeric binder and liquid medium characteristic of typical coatings, the present composition includes an anti-sag and anti-settling effective amount of a thixotropic rheological modifier. The rheological modifier of the present invention comprises two essential components, a backbone polymeric block and a graft polymeric block. The polymeric backbone comprises recurring monomeric units derived from monomers selected from the group consisting of one or more α-olefins and one or more unsaturated carboxylic acids. The polymeric backbone may include unreacted pendent carboxylic acid functions, which may be further reacted with an alkaline substance to be partially or fully neutralized; or, may be un-neutralized. Connected to the backbone are reaction residues formed by the reaction of the acid functions of the backbone and amine functions of one or more polymeric grafts comprising recurring monomeric units derived from monomers selected from the group consisting of:

—NHC(O)RC(O)NHR$_1$— and

—NH—R—C(O)— or a combination thereof, wherein R is an alkylene group of at least about 2 carbon atoms, and R$_1$ is R or aryl.

The rheological modifier utilized in the present composition improves both the anti-sag and anti-settling characteristics of the coating composition.

The present invention further includes a process for producing the improved coating composition above, which comprises the following steps:

(1) dispersing the rheological modifier of the present invention in a liquid medium to form a gel;

(2) incorporating the gel into a coating composition.

The rheological additive of the present invention may be incorporated into a paint composition in the pigment grinding step, and preparation of a coating composition containing the present additive requires fewer precise process steps than preparation of coatings with other known rheological modifiers, so production on a commercial scale is simplified. The present process provides an anti-sag and anti-settling effective composition whose performance is less affected by processing parameters such as heat, shear and air entrapment, than other known additives. In addition, the chemical structure of the rheological additive utilized in the present invention evolves fewer harmful by-products during processing than known additives, and provides a coating composition which releases fewer deleterious solvents during drying.

DETAILED DESCRIPTION OF THE INVENTION

The rheological modifiers utilized in the improved coatings of the present invention may generally be described as thixotropic in nature. When the modifiers of the present invention are incorporated into a coating, a wide range of coating viscosities may be produced, depending on shear rate.

In the improved coatings of the present invention, when shear forces are applied to the coating in the unsheared state, as shear rate is increased, viscosity decreases. The longer the material is sheared, the lower the viscosity, until some limiting value is reached. If the shear rate is then decreased, viscosity rebuilds slowly. This increase in viscosity is time dependent; and, given sufficient time (seconds to many hours) the viscosity returns to the value originally observed in the original unsheared state.

While not wishing to be bound by any theory, it is believed that intermolecular attractions between highly polar carboxyl and amide functionalities in the rheological additive of the present invention create a complex colloidal network in the unsheared state during storage. As the shear rate increases, the weak intermolecular attractions in the colloidal structure break down, and the coating exhibits excellent high-shear viscosity properties necessary for effective processing and application. As the rate of shear is decreased, the intermolecular structure again begins to rebuild and predominate. At low post-application shear rates, the intermolecular attractions again predominate to provide a coating viscosity which is high enough to prevent sag during the drying of the coating, but low enough to provide excellent levelling and film-forming properties. At the extremely low shear rates experienced during storage, the intermolecular attractions form a colloidal network which acts to reduce flocculation of any dispersed pigments present in the composition. As understood, this colloidal network envelops the pigment particles and reduces the interaction of electrostatic charges on the surface of the particles.

The rheological additive of the present invention improves the sag resistance of a coating composition. Following application on a surface, the coating must maintain sufficient viscosity during the drying process to prevent unsightly runs and drips until the finish is dry. The rheological additive of the present invention was determined to increase the sag resistance of a coating composition by at least about 100%, compared to a control composition without the rheological additive.

The rheological additive of the present invention is also useful as an anti-settling additive for preventing excessive flocculation during storage. In practice, few pigments are dispersed to their ultimate particle size, and paints usually contain many aggregates and flocculants; however, the additive of the present invention maintains pigment dispersion levels at an adequate level for extended periods. Following extended storage of a pigmented composition containing the rheological additive of the present invention, it was noted that at least a 600% improvement in settling occurred, compared to a control composition without the rheological additive.

The rheological modifier in the improved coating composition of the present invention comprises two component parts. The first component is a backbone characterized by recurring monomeric units derived from monomers selected from the group consisting of one or more α-olefins and one or more unsaturated carboxylic acids; the second is a graft characterized by at least one recurring monomeric unit selected from the group consisting of:

and

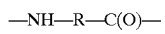

or a combination thereof, wherein R is an alkylene group of at least about 2 carbon atoms, and $R_1$ is R or aryl.

The backbone preferably comprises from about 50 to about 99.5, more preferably, about 65 to about 99.2, and most preferably from about 80 to about 98 mol percent of the α-olefin, based on the total moles of recurring monomer units in the backbone.

The molecular weight of the backbone component of the additive in the present invention may vary widely in molecular weight. The number average molecular weight of the backbone preferably ranges between about 500 to about 6000, more preferably between about 1000 to about 3500, as measured by a vapor pressure osmometer.

The α-olefinic component of the copolymer making up the backbone of the present invention may vary widely, and is preferably derived from olefins having from about 2 to about 8 carbon atoms, such as ethylene, propylene, isobutylene, butylene, and hexene. The α-olefin component is more preferably ethylene or propylene. The most preferred α-olefin component is ethylene.

The carboxylic acid component of the backbone of the additive of the present invention may vary widely and can be derived from any conventional unsaturated carboxylic acid. Useful acids include such carboxylic acids, or derivatives thereof, as disclosed in U.S. Pat. No. 3,658,741, which is incorporated herein by reference. Useful carboxylic acids include both monocarboxylic and polycarboxylic acids and derivatives thereof, including esters and anhydrides, which are capable of reacting with an amine function to form an amide linkage, such as acrylic acid, methacrylic acid, ethacrylic acid, itaconic acid, crotonic acid, maleic acid and fumaric acid. Also useful are acid halides, amides and esters including acrylyl chloride and acrylamide. Esters which can be used include methyl acrylate, methyl methacrylate, ethyl acrylate and dimethylaminoethyl methacrylate. Also useful are monoesters of dicarboxylic acids, such as methyl hydrogen maleate, methyl hydrogen fumarate, ethyl hydrogen fumarate, and maleic anhydride. Preferred carboxylic acids or derivatives thereof include unsaturated monocarboxylic acids containing from about 3 to about 6 carbon atoms and dicarboxylic acids containing from about 4 to about 8 carbon atoms. Particularly preferred compounds include α,β-ethylenically unsaturated acids and derivatives thereof. A more preferred α,β-ethylenically unsaturated monocarboxylic acid are acrylic acid and methacrylic acid. A most preferred α,β-ethylenically unsaturated carboxylic acid is acrylic acid.

The amount of the carboxylic acid component in the backbone of the copolymer may vary widely. Typically, the backbone preferably comprises about 1% to about 35% of the carboxylic acid component, more preferably about 2% to about 20%, based on the total moles of recurring monomer units in the backbone.

A particularly preferred backbone component is a copolymeric block of ethylene and an α,β-ethylenically unsaturated monocarboxylic acid having about 3 to about 6 carbon atoms, such as acrylic acid, where the mol % of acid derived units is from about 3.5% to about 12%, and the number average molecular weight is from about 1500 to about 3500.

As a second essential component, the rheological modifier of the coating composition of this invention includes one or more second polymeric blocks comprising polyamides. Illustrative of useful polyamides are those characterized by the presence of recurring carbonamide groups as an integral part of the polymer chain which are separated from one another by at least two carbon atoms. These polyamides have recurring unit represented by the general formula:

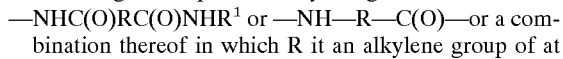
bination thereof in which R it an alkylene group of at least about two carbon atoms, preferably alkylene having from about 2 to about 10 carbon atoms and $R^1$ is R or aryl. Exemplary of such polyamides are polyamides formed by the reaction of diamines and diacids such as poly(hexamethylene adipamide) (nylon 6,6), poly (hexamethylene sebacamide) (nylon 6,10), poly (hexamethylene isophthalamide) (6,IP), poly (hexamethylene terephthalamide), (nylon 6,T), poly (heptamethylene pimelamide) (nylon 7,7), poly (octamethylene suberamide) (nylon 8,8), poly (nonamethylene azelamide) (nylon 9,9), poly (decamethylene azelamide) (nylon 10,9), poly(bis[4-aminocyclohexyl]methane-co-dodecanedioic acid) (PACM-12). Also illustrative of useful polyamides are those formed by polymerization of amino acids and derivatives thereof, as for example lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminoocatanoic acid)(nylon 8), poly(9-aminononanoic acid) (nylon 9), poly(10-aminodecanoic acid) (nylon 10), poly(11-aminoundecanoic acid) (nylon 11), poly (12-aminododecanoic acid) (nylon 12) and the like. Blends of two or more polyamides may also be employed.

Copolymers formed from recurring units of the above referenced polyamides can be used. By way of illustration and not limitation, such polyamide copolymers include: caprolactam-hexamethylene adipamide (nylon 6/6,6), hexamethlyene adipamide-caprolactam (nylon 6,6/6, hexamethylene adipamide/hexamethylene-isophthalamide (nylon 6,6/6IP), hexamethylene adipamide/hexamethylene-terephthalamide (nylon 6,6/6T,) trimethylene adipamide-hexamethylene-azelaiamide (nylon trimethyl 6,2/6,2), and hexamethylene adipamide-hexamethylene--azelaiamide capryllactam (nylon 6,6/6,9/6) as well as others polyamide copolymers which are not particularly delineated here. poly (decamethylene sebacamide) (nylon 10,10), poly[his(4-amino cyclohexyl)methane-1,10-decanecarboxamide)] (Guiana), Poly(m-xylylene adipamide), poly(p-xylylene sebacamide),poly(2,2,2-trimethyl hexamethylene terephthalamide), poly(piperazine sebacamide), poly (dodecamethylene terephthalamide) (nylon 12,T), and the like.

Preferred polyamides for use in the practice of this invention are poly(caprolactam) and poly(hexamethylene adipamide). The particularly preferred polyamide is poly (caprolactam).

The number average molecular weight of the polyamide may vary widely, but usually, the number average molecular weight of the polyamides utilized in the present invention is from about 5000 to about 35,000. In the particularly preferred embodiments, the number average molecular weight is from about 10,000 to about 22,000. Amongst the particularly preferred embodiments, most preferred are those in which the number average molecular weight of the polyamide is about 18,000.

The amount of polyamide included in the copolymers of the invention may vary widely, and is usually from about 1% to about 85% percent by weight based on the total weight of the copolymer. In the preferred embodiments of this invention, the amount of polyamide is from about 15 to about 30 weight percent based on the total weight of the copolymer; and in the particularly preferred embodiments of the invention the amount of polyamide in the copolymer is from about 20 to about 28 weight percent based on the total weight of the copolymer. Amongst the particularly preferred embodiments, most preferred are those embodiments in which the amount of polyamide is from about 22 to about 26 percent by weight, based on the total weight of the copolymer.

The copolymer modifier of the present invention optionally may include residual acid functions substituted on the backbone. Carboxyl groups in the amide chain ends, as well as residual carboxyl groups on the copolymer acid, can be neutralized. Cations having valences of 1 to 3 can be used to neutralize the binder of the present invention. Preferably, metallic cations are derived from a group of metals which can be chosen from Groups IA, IIA, IIB, IIA and the transition elements of the Periodic Table of Elements to be used in this process. Metal cations which are preferred are sodium, potassium, magnesium, calcium, barium, zinc and aluminum cations, with sodium, zinc, calcium and magnesium cations being most preferred.

The copolymers making up the backbone of the present invention may exhibit a wide range of acid numbers. Preferably, the acid numbers of the copolymers range from about 1 to about 180, with an acid number from about 40 to 160 being preferred, and an acid number from about 40 to 120 being most preferred. The acid number is determined by the number of milligrams of potassium hydroxide needed to neutralize one gram of acid. The number average molecular weight of the most preferred copolymer is from about 500 to about 5000, and preferably from about 1000 to about 3500. The most preferred copolymers of ethylene and acrylic or methacrylic acid contain from about 1% to about 20% by weight acrylic acid or methacrylic acid in the copolymer, preferably about 3.5% to about 12%, and are further characterized by a number average molecular weight between about 1500 to about 3500, and hardness (0.1 mm penetration) between 0.5 to 30, preferably 1 to 10 when tested at room temperature about 25° C. (77° F.) according to ASTM D-5 using a needle with a load of 100 grams for 5 seconds.

The copolymers most useful in the present invention are characterized by an acid number of from about 10 to about 200, preferably about 25 to about 150, and most preferably about 40 to about 125. The copolymer reaction product has a Brookfield viscosity at 140° C. of from about 500 to about 5,000, preferably about 500 to about 2,000, and more preferably about 500 to about 1,500.

Table I below characterizes the most preferred ethylene acrylic acid copolymers.

TABLE I

| Copolymer Acid | Softening Pt ASTM E-28 | | Hardness dmm (ASTM D-5 | Density g/cc D-1501 | Brookfield @ 140° C. CPS | Acid No. mg KOH/g | Wt. % Acrylic |
|---|---|---|---|---|---|---|---|
| | ° C. | ° F. | | | | | |
| AC ® 540 | 105 | 266 | 2.0 | .93 | 575 | 40 | 4 |
| AC ® 580 | 102 | 216 | 4.0 | .94 | 650 | 75 | 9.4 |
| AC ® 5120 | 92 | 128 | 11.5 | .94 | 650 | 120 | 15 |

The copolymer acids are available from Allied-Signal Inc., as A-CO® 540(A); A-CO® 580(B) and A-C® 5120(C).

In accordance with the present invention up to 100, preferably from about 50 to about 100 and more preferably about 10 to about 30 percent of the carboxylic acid groups in the backbone are reacted with from about 0.1 to about 50, preferably, 0.1 to 40, more preferably about 0.5 to about 30, and most preferably about 5 to about 25 weight percent based on the weight of the copolymer of at least one amide chain derived from at least one amino acid compound. There can be from about 10 to about 30, or about 0.1 to about 10 weight percent of at least one amide derived from at least one amino acid.

The average amide chain length reacted at each carboxyl site in the backbone of the copolymer is not critical, so long as the grafts are not of such length to inhibit solubility of the rheological additive in a typical paint formulation. The average amide chain length is preferably from about 1 to about 250, preferably 1 to 200, with specific embodiments including amide chain lengths of from 1 to 10, and 1 to 5 amide groups. Amide chain lengths of from 100 to 250 amide groups may be present in the copolymer of the present invention.

As other essential ingredients, the coating composition of this invention comprises a suitable binder and a liquid medium. Any conventional binder and liquid medium can be used, provided that they provide the coating system with desirable coating properties.

A wide range of conventional binders may be used in the present invention. Illustrative of useful binders are those which contain drying oils which react on curing to form a solid polymer. Drying oils include unsaturated compounds such as linseed oil, safflower oil, soya oil, tall oil, cottonseed oil, and tung oil, which usually contain fairly large percentages of unsaturated acids such as oleic, linoleic, linolenic, and eleostearic acids. These unsaturated oils react with atmospheric oxygen in the presence of metallic salts to form solid polymer.

Illustrative of other useful binders are thermoset polymers and thermoplastic polymers. Thermoset polymers for use as binders in the practice of this invention may vary widely. Illustrative of such useful thermoset polymers are oil-free alkyds derived from the esterification of a polybasic acid such as phthalic acid and a polyhydric alcohol such as glycol; allylics such as those produced by polymerization of dialkyl phthalate, dialkyl isophthalate, dialkyl maleate, and dialkyl chlorendate; cross-linked with amino resins such as those produced by addition reaction between formaldehyde and such compounds as urea, aniline, ethylene urea, sulfonamide and dicyandiamide; epoxies such as epoxy phenol novolak resins, diglycidyl ethers of bisphenol A and F and cycloaliphatic epoxies; phenolics such as resins derived from reaction of substituted and unsubstituted phenols such as cresol and phenol with an aldehyde such as formaldehyde and acetaldehyde; polyesters; silicones; and urethanes formed by reaction of a polyisocyanate such as 2,6-toluene diisocyanate, 2,4-toluene diisocyanate, 4,4'-diphenylmethane diisocyanate, 1,6-hexamethylene diisocyanate and 4,4'-dicyclohexylmethane diisocyanate with a polyol such as polyether polyol (trimethylol propane, 1,2,6-hexanetriol, 2-methyl glycoside, pentaerythritol, poly(1,4-tetramethylene ether) glycol, sorbitol and sucrose), polyester polyols such as those prepared by esterification of adipic acid, phthalic acid and like carboxylic acids with an excess of difunctional alcohols such as ethylene glycol, diethylene glycol, propanediols and butanediols.

Preferred thermosetting resin binders are alkyds, epoxies, unsaturated polyesters, thermosetting acrylics, phenolics, polyurethanes and coumarone indene. Preferred alkyds are polyester resins made from polybasic acids and polyhydric alcohols. Glycerol and pentaerythritol may be used for the polycarboxylic acids. All of the oils described above can be used in alkyds by converting the fatty acid oils to monoglycerides and then reacting with a dibasic acid such as phthalic anhydride.

Alkyd resins vary greatly in their properties because of the many different oils, alcohols, and acids that can be used to make them. In general, alkyds have faster drying, better gloss retention, and better color than oils. Most unmodified alkyds have low chemical and alkali resistance. Alkyds can be modified with rosin esterified in place of some oil acids. Phenolic resins, such as o- or p-phenylphenol, can also be used in order to produce greater hardness and better chemical resistance. Styrene and vinyl toluene may also be used to modify alkyds for faster dry, better hardness, and toughness. Silicones may be added to alkyds to provide paints having good adhesion, hardness, flexibility, toughness, exterior durability, and resistance to solvents, acids, and alkalis. Acrylic monomers can be copolymerized with oils to modify alkyd resins for fast dry, good initial gloss, adhesion, and exterior durability. Aromatic acids, e.g., benzoic or butylbenzoic, may be used to replace part of the fatty acids for faster air dry, high gloss, hardness, chemical resistance, and adhesion.

Preferred epoxy resins are prepared from epichlorohydrin and a dihydroxy compound, usually a bisphenol. Two reactions are involved in the polymerization: condensation to eliminate HCl and addition reactions to open epoxide rings along the chain to produce hydroxyl groups. The polymer has epoxide rings at each end and hydroxyl groups along the chain, which ensure good adhesion to polar surfaces such as metals. There are two types of epoxy resins, catalyzed types and epoxy esters.

Catalyzed epoxies must be converted to useful products by reaction with curing agents, e.g., amines, polyamide resins, ketamine, polysulfide resins, anhydrides, metallic hydroxides, or Lewis acids. Most of these materials are supplied as two-package systems to separate the materials until just before application. Polymer curing takes place by reaction of a curing agent with epoxide rings to cross-link the polymer. Paints made from these polymers have excellent chemical resistance and hardness and are often used for maintenance coatings, trade sales specialties, and industrial finishes. Chalking with exterior exposure, poor impact resistance, and the two-package system limit the use of epoxy finishes. The epoxy resin can also be reacted with drying oils or fatty acids to produce epoxy esters, which cure by air drying or heat. Paints made with epoxy esters do not have as good chemical and solvent resistance as catalyzed epoxies, but they are superior to oils and alkyds in this respect. They also exhibit chalking on exterior exposure.

Preferred thermosetting acrylic resins have at least one monomer belonging to the acrylic family which will react with itself or other resins at elevated temperatures to cross-link in order to cure. In addition to the acrylic monomers previously listed, acrylonitrile, acrylamide, styrene, and vinyl toluene are often used in these polymers. Thermosetting acrylic paints, which are hard and stain-resistant and have high gloss, are often used for appliance finishes.

Tough flexible finishes can be formulated for coil coatings. Preferred polyesters are unsaturated thermosetting polyester resins similar to those used for reinforced plastic. Although alkyds can be considered unsaturated polyesters, this term has been reserved for resins which have unsaturated compounds in the backbone of the polymer. These resins are made by reacting unsaturated dibasic acids, e.g. maleic anhydride, citraconic anhydride, fumaric acid, itaconic acid, phthalic anhydride, and adipic acid, with polyhydric alcohols, e.g., propylene glycol. Styrene or some other aromatic vinyl monomer is added to the polyester resin, which is then solubilized and made into a paint. Inhibitors, e.g., hydroquinone, may be added to prevent premature polymerization in the can; a catalyst must be added to initiate polymerization of the styrene monomer and the polyester resin for curing, which is often carried out at elevated temperatures. Polyester finishes are very hard, tough, resistant to solvents, and fairly heat-resistant. Silicones may be added to modify polyester for better exterior durability.

Preferred phenolic resins as used in coatings are primarily made from phenol and para-substituted phenols reacted with formaldehyde to form methylol groups on the phenol ring. Condensation polymers are often produced by reacting these groups with phenol. Phenolic coatings have fast dry, high build, and good resistance to moisture and chemicals. Their poor initial color and tendency to yellow after application limit their use. Phenolic coatings may be used for baked can coatings, and oil-modified phenolaldehyde finishes may be used for marine finishes and aluminum paints.

Polyurethanes are based upon reactions of isocyanates, RNCO where R is an organic radical. Urethane coatings have excellent solvent and chemical resistance, abrasion resistance, hardness, flexibility, gloss, and electrical properties. They are, however, rather expensive, and the aromatic isocyanates yellow after application. Polyisocyanates such as toluene diisocyanate react with hydroxylated drying oils to produce resins analogous to alkyds and epoxy esters. Finishes made with these urethane oils air-dry by oxidation of the unsaturated oils. Polyhydroxy materials can be reacted with isocyanates with an excess of the isocyanate so that the polymer will contain NCO groups, which react with moisture in the air after the coating is applied to crosslink the polymer for curing. Moisture-cured urethanes are difficult to pigment since the pigments must be completely dry and non-alkaline. They are used primarily for clear coatings. Phenols will react with an isocyanate to block the isocyanate or prevent it from reacting with hydroxylated materials in the system. When this type of coating is heated to 150° C. after application, the phenol volatilizes from the film, leaving the isocyanate free to react with the hydroxyl-bearing resin to cure the film. Where a catalyst is employed, two-package systems are also used where a catalyst, e.g., a tertiary amine, is added to cross-link the polymer.

Coumarone-indene resins which are derived from coal tar are used widely to make aluminum paints since they aid leafing of the aluminum and minimize gas formation. They have a yellow color, however, and only fair durability except in aluminum paints.

Urea-formaldehyde, melamine-formaldehyde, and other triazine-formaldehyde resins are all hard, glossy, colorless, brittle, and chemically resistant thermosetting polymers used to modify basic coating vehicles, such as alkyds, thermosetting acrylics, and vinyls. Rosin may be used in making vehicles, such as maleic rosin alkyds, for use in consumer products or industrial finishes. Silicones may be used to modify alkyds and polyesters for better exterior durability.

Illustrative of still other polymers which are useful as binders are thermoplastic resins, such as polyesters, polyamide, polycarbonates, polymers derived from the polymerization of $\alpha,\beta$-unsaturated monomers and the like. According to certain preferred embodiments, the binder is a polyester melamine backing coating. Preferred thermoplastic binders are vinyl polymers and copolymers such as vinyl chloride/vinyl acetate copolymers and the like; cellulosic polymers such as nitrocellulose, ethyl cellulose, ethyl hydroxyethyl cellulose, cellulose acetate, hydroxy ethyl cellulose and the like; rubbers such as styrene-butadiene copolymer, chlorinated natural rubbers, and the like; and acrylic polymers or copolymers such as those derived from methyl acrylates, butyl acrylate, ethyl acrylate, 2-ethylhexyl acrylate and the like.

The liquid dispersion medium used in the practice of this invention may vary widely, and any such medium used in conventional coating compositions may be used. Such media and the particular binders with which they are used are well known in the art and will not be described in detail. Illustrative of such dispersion media are water and organic liquids such as hydrocarbons. Coatings are often classified on the bases of the dispersion medium; those which utilize water as the primary dispersion medium of the composition are distinguished from those which utilize organic liquids. Many of the same polymeric binders can be used in both types of compositions.

Water based paints are primarily latex paints, where the polymer particles are a discontinuous phase and water is the continuous phase. In latex paints, the latex binder consists of very small particles of liquid to semisolid polymer separated by water, which is the continuous phase. When the water evaporates, the polymer particles touch each other and fuse together, or coalesce, into a continuous paint film on drying. When used, pigment particles are also dispersed in the water phase, and the dry paint film consists of a mixture of pigment and polymer particles fused together. If the latex particles are so hard that they will not fuse together when the water evaporates, plasticizers are preferably added, e.g. carbitol acetate or dibutyl phthalate.

Rutile titanium dioxide is the primary pigment used in paints to obtain opacity, or hiding, in white or pastel paints. Semi-chalking grades are used for interior paints, chalk-resistant grades for exterior paints, and fine-particle-size grades for semigloss paints. Zinc oxide is sometimes used for exterior paints to help prevent mildew, but care must be taken in using this pigment because of its chemical reactivity.

A number of pigments, such as calcined clay and delaminated clay, can be used to advantage in paints as titanium dioxide extenders to increase opacity. These pigments have large surfaces areas due to irregular surfaces or fine particle size, and the vehicle will not cover all the pigment surface when the paint film is dry, leaving entrapped air in the film. The interfaces of air with pigment and vehicle increase the light scattering within the film and thus the opacity.

Many common extenders, e.g., mica, calcium carbonate, clay, talc, silica, and wollastonite, are used in coatings. Since these pigments vary in particle size, shape, hardness, color, surface treatment, and water demand, they can affect viscosity, flow, gloss, color, cleanability, scrubbability, enamel holdout, uniformity of appearance, and even opacity to some extent. Extender pigments are selected to obtain the desired properties for each type of paint. Slightly soluble ammonium phosphate compounds are used as the primary pigment in intumescent fire-retardant paints.

Surfactants are used in paints to help wet and disperse pigments, emulsify liquids, and function as defoamers. These materials have a balanced polar-nonpolar structure, which in water-base paints is usually referred to as a hydrophile-lipophile balance. The chemical composition of surfactants can vary greatly, and they are usually only classified into anionic, cationic, and nonionic types. Anionic surfactants (arylalkylsulfonates, sulfosuccinic acid esters, soaps, water-soluble amines, and sulfonated oils) and nonionic surfactants (partial esters of polyhydric alcohols with long-chain carboxylic acids, long-chain alcohols with free hydroxyl groups, and ethers of poly-hydric alcohols with long-chain fatty alcohols) are used primarily in latex paints.

The more hydrophilic water-soluble surfactants are used to wet and disperse pigments. Surfactants with a lipophilic chain to dissolve in a non-polar liquid and a hydrophilic group to dissolve in water are used to emulsify varnishes or oils in latex paints. Surfactants which are not water-soluble are used as defoamers.

Thickeners or protective colloids are used in latex paints to produce the desired viscosity and help stabilize emulsions and pigment dispersions. Water-soluble protein or casein dispersions and cellulosic polymers (carboxymethyl, hydroxyethyl, and methyl cellulose) are the most commonly used. Soluble polyacrylates, starches, natural gums, and inorganic colloidal materials have also been used.

Protective colloids can affect many properties of a paint, such as washability, brushability, rheological properties, and color acceptance. Since latex paints are susceptible to bacterial attack, they should contain preservatives. Several different types of preservatives can be used: phenolic, mercuric, arsenic, or copper compounds, formaldehyde, and certain quaternary chlorinated compounds. Some of these compounds are chemically active, and some are toxic, facts which must be considered in selecting a preservative. The main types of latex polymers used in latex paints are styrene-butadiene, vinyl homo- or copolymers, and acrylic polymers or copolymers.

In the preferred embodiments of the invention, the dispersion medium is an organic liquid, because unmodified thermosetting polymeric binders such as alkyds can be solubilized in such liquids. However, in other embodiments many of the synthetic polymers now used in solvent or latex paints can be solubilized in water. Carboxylic, hydroxyl, epoxy, or amine groups on a polymer in conjunction with coupling solvents, such as alcohols, alcohol ethers, or glycol ethers, are the primary mechanisms by which resins are solubilized. Maleic or fumaric acids can be reacted with drying oils to produce resins with some carboxyl groups which can be solubilized in water with ammonia or amines. Alkyds can be solubilized in water by leaving a reactive carboxylic group on the resin instead of terminating the reaction with a monobasic acid or drying-oil acid. Dimethylol propionic acid, $CH_3C(CH_2OH)_2COOH$, and thrombolytic anhydride have been used for this reaction. A styrene-alkyl alcohol copolymer esterified by a fatty acid and reacted with maleic anhydride to provide solubility can be used as a water-soluble paint vehicle. Amine-solubilized water soluble polyesters, acrylics, epoxy esters, and phenolics can also be prepared. Water-soluble resins are usually solubilized by volatile alkalis, such as amines, to prevent the paint resin from remaining water-soluble after application.

As a preferred optional ingredient, the coatings of this invention includes a colorant or pigment. Such materials are well known in the art and will not be described in any great detail. Illustrative of useful pigments are metal oxides, such as titanium dioxide, zinc oxide, lead oxide, iron oxide and the like; and metal sulfides such as zinc sulfide, cadmium sulfide and the like. A large number of organic pigments are also available for use in coating compositions.

In addition to the pigment, binder, and liquid, a coating composition also may contain many optional additives, such as defoamers, extenders, thickeners, flow agents, drying agents catalysts, preservatives, wetting agents, barrier enhancers such as clay and mica, and surfactants, viscosity modifiers and plasticizers to improve various properties. These optional additives are well known in the art and will not be described herein in any great detail. The selection of the pigments, binder, and additives depends, of course, upon the properties desired in the coating to be made.

The rheological additive of the present invention improves the sag resistance of a coating composition. Following application on a surface, the coating must maintain sufficient viscosity during the drying process to prevent unsightly runs and drips until the finish is dry. This problem is particularly acute with baking systems, in which the coating is dried rapidly at high temperatures. For the purposes of the present invention, the sag resistance is measured by a drawdown technique (ASTM D-4400 Method A), wherein varying thicknesses of the coating are drawn down on a drawdown card, such as the Laneta 7B, which has been retained on a vacuum plate. The drawdown card is then positioned vertically, and the coatings are allowed to dry. The drying may be conducted at room temperature, or an elevated temperature, such as in an oven. When drying is complete, the coatings are inspected, and the sag resistance value of the coating is determined by noting the coating thickness wherein runs or drips first appear. The coating composition of the present invention was determined to have an sag resistance value in excess of 12 mils, as measured according to ASTM D-4400, at a baking temperature of about 150° C. The rheological additive of the present invention was determined to increase the sag resistance of the composition by at least about 100%, compared to a control composition without the rheological additive.

The rheological additive of the present invention is also useful as an anti-settling additive for preventing excessive flocculation during storage. In practice, few pigments are dispersed to their ultimate particle size, and paints usually contain many aggregates and flocculants; however, the additive of the present invention maintains pigment dispersion levels at an adequate level for extended periods. In the present invention, coating compositions containing the rheological additive were stored in standard one pint paint cans at room temperature for extended periods, and the settling of the composition was measured according to ASTM D-869 and D-1849. Following extended storage of a pigmented composition containing the rheological additive of the present invention, it was noted that at least a 300% improvement in settling occurred, compared to a control composition without the rheological additive.

The amount of rheological additive included in the coating composition may vary widely, and any amount which improves the anti-sag and anti-settling properties to any extent may be used. Generally, the amount of rheological additive incorporated into the present coating composition should be sufficient to increase the sag resistance of the composition by at least about 100%, and to improve the settling resistance of the composition by at least about 300%, compared to a control composition without the rheological additive. The amount of rheological additive employed in the present composition is preferably at least about 0.5–2.0% by weight, more preferably at least about 1–2% by weight, and most preferably at least about 1% by weight, based on the total weight of the coating composition.

Following addition of an effective amount of the rheological modifier of the present invention, the low shear viscosity ranges from about 3000 centipoise (cps) to about 5000 cps, as measured by a Brookfield Synchro-Lectric RVF viscometer; or, about 90–100 Krebs Units (KU), as measured on a Stormer Viscometer (ASTM D-562). As used herein, the term "low shear" means a shear rate applied to the composition at about 0.1 $sec^{-1}$ to about 50 $sec^{-1}$ (storage and post application shear rates). Following addition of the present additive, the high shear viscosity of the composition ranges from about 5 cps to about 20 cps, as measured by an ICI Cone and Plate viscometer. As used herein, the term "high shear" means a shear rate applied to the composition at about 3000 $sec^{-1}$ to about 12,000 $sec^{-1}$ (application shear rates).

The rheological additives of the present invention can be prepared by any suitable method such as described in above referenced U.S. Pat. No. 3,658,741 and in U.S. Patent No. 5,130,372, which are incorporated herein by reference. For example, an olefin such as ethylene desirably constitutes at least 65% by weight of the monomer feed and the comonomer from 1.0% to 35% of the feed, preferably 2 to 20% by weight of the feed. Under specific conditions of vapor phase polymerization the ratio by weight of the monomers in the feed and in the product are substantially constant. The ratio of comonomer between feed and product are at most only minor, such that products obtained by the invention contain a major portion of ethylene and generally 0.8% to 35% by weight of the comonomer, preferably 2.0% to 20% by weight of the comonomer. The ratio of comonomer in the product to comonomer in the feed is preferably within the range of 0.7:1 to 1.8:1.

The coating composition of this invention can be conveniently manufactured using conventional procedures well known to those of skill in the art. Illustrative of such procedures are those described in detail in U.S. Patent Nos. 4,403,866, 2,923,438, 3,601,589, and 3,916,168; and British Pat. No. 1,589,705.

In a preferred embodiment, the necessary preparation time for the coating composition can be lessened by making a pre-dispersion or concentrate which may consist of the rheological modifier dispersed in a liquid medium or in a resin. While the liquid medium utilized to prepare the concentrate may vary widely, the preferred liquids are xylene and n-butanol, and mixtures thereof. The most preferred liquid for the concentrate is xylene. The preparation methods for the concentrate may be similar to that described herein for the dispersion of pigments when the medium is a liquid. When the medium is a thermoplastic resin, a pre-cured thermosetting resin or a combination thereof, methods known in the art for compounding fillers in such resins may be employed.

Generally, the concentrate is preferably prepared by dispersing fine particles of the copolymer in a liquid medium under heating and agitation. Any combination of heating, cooling and agitation rates that provides a concentrate which is a clear, gel-like dispersion of fine particles of the copolymer may be used.

In a preferred embodiment, following the heating step, the solution is cooled until the cloud point is reached, the temperature where the copolymer precipitates out of solution. The cloud point may be determined by the continued further opacity of the blend. The mixture is then reheated until clarified, and allowed to cool; but, beginning at 5° C. above the cloud point, until 10° C. below the cloud point, the mixture is rapidly cooled to produce a translucent gel dispersion of fine particles.

In the most preferred embodiment of the present invention, the viscosity of the concentrate is adjusted such that the concentrate is pourable at room temperature. This ensures that subsequent incorporation of the concentrate into a coating composition will be a simple, single-step process.

The concentrate is then added to the paint formulation. The loading of the copolymer may be varied widely depending on the intended application; but, generally a loading of about 0.5–2.0% is used, based on the total formula weight of the composition. A loading of about 1–2% of the copolymer is preferred, and a loading of about 1% is most preferred. For example, if the copolymer is to be added at a 1% loading based on total formula weight of the coating composition, and the rheological modifier is prepared in a 20% solids dispersion form, 5% on total formula weight of dispersion is added.

Following addition of the dispersion, the grind paste is placed under sufficient shear to disperse any added pigments. As the pigments are dispersed, it is preferable that sufficient kinetic energy be input to raise the temperature of the grind base to at least about 140° F. (60° C.). This temperature is normally achieved in the pigment dispersion process, and, typically, no additional heating of the grind base is required.

To replace liquid volatilized during processing, additional liquid may be added to adjust the weight per gallon (ASTM D-1475) of the coating composition. Any suitable liquid medium may be utilized in this procedure, and normally the same liquid medium is utilized as in the coating composition. For example, in the present invention, xylene is preferably used as the liquid medium for the additive dispersion, and methyl iso-amyl ketone is preferably used as the liquid medium for the coating composition.

The particle size of the rheological modifier incorporated into the concentrate is important, and the size should be such that the polymer can be dispersed in the concentrate or subsequent coating composition to the desired extent. Whether by grinding, milling, shearing, or dispersing, the particle size of the rheological additive should preferably be less than about Hegman 6, as measured according to ASTM D-1210.

A primary concern in the manufacture of coatings is the dispersion of pigments in the liquid portion. The coating compositions of this invention may optionally contain pigments to act as colorants, extenders, diffusion barriers and the like. Pigments used in coating compositions contain aggregates of fine particles, which are held together by strong forces of attraction. Work is required in the form of high shear or attrition applied to the pigment liquid slurry to reduce the pigments as close to their ultimate particle size as is necessary for use in a particular coating composition. Considerable work may also be required to wet the surface of the pigment and to displace any air or moisture that may be absorbed on the surface by the liquid. Wetting agents such as soaps or detergents in the dispersion phase of paints are often used to help wet and disperse pigments.

Since some pigments are harder to disperse than others, different types of dispersing equipment or mills are used. Dispersing pigments in a liquid is often called grinding although there is very little reduction in size of the original pigment particles during the dispersion operation of paint manufacture.

The high-speed stone mill consists of a stationary carborundum stone and high-speed rotating stone. Pigment pastes are passed between these stones; the distance between the stones can be varied for more or less shearing action. These mills are suitable for high production rates of paints fairly easy to disperse, e.g., architectural paints, where very fine dispersion is not required.

Roller mills consist of steel rollers rotating in opposite directions at different speeds. The pigment-liquid paste is passed between the rolls, which can be adjusted to different clearances. Three-roll mills are the most widely used in the paint industry. Roller mills have relatively slow production rates and require skilled operators, but are capable of producing fine dispersions.

Heavy-duty dough mixers, consisting of two roughly S-shaped blades which overlap and rotate in opposite directions, are sometimes used to disperse very heavy pastes.

Ball and pebble mills consist of large cylindrical steel tanks which rotate around a horizontal axis. The mill is partly filled with steel or porcelain balls or pebbles and the material to be dispersed. Baffle bars are usually added to the sides of the tank to help lift the balls for better dispersion. Steel balls are more efficient because of their greater density but cannot be used to produce white paints. Ball mills require little attention after they have been charged and are capable of producing good dispersions.

The sand mill consists of a cylinder containing coarse sand as a grinding medium. The pigment paste to be dispersed is fed into the mill, and rotating impeller disks driven by a vertical shaft impart a circulation pattern to the sand-paste mixture. The difference is velocity between the particles near the surface of the impellers and the rest of the material develops a high shear action to disperse the pigments. A coarse screen allows the pigment slurry to pass through the mill while retaining the sand in the mill. Pigment slurrys can be passed through these mills for continuous operation. Production rates of sand mills can be fairly good, and dispersion is quite good. These mills are often used for high-quality industrial finishes.

The high-speed disperser consists of a tank containing a circular impeller driven at high speed by a vertical shaft. Dispersion of the pigment liquid mixture is achieved by high shear action developed near the surface of the impeller. High-speed dispersers are used where very fine dispersion is not required or whenever the pigments will disperse easily in the liquid. The production rate is very high, and this type of equipment is used to manufacture most architectural paints.

After the conjugated polymer and the optional pigments are dispersed and stabilized in the liquid or concentrate, said liquid or concentrate is usually transferred to a thin-down tank, equipped with slower agitation, where the coating is adjusted to the desired viscosity and shaded. Materials can be added to the paint in the thin-down tank that are not required in the grinding operation and can be added with slow agitation. The binder of a solvent-thinned paint is usually added during the grinding operation; the binder of a latex paint is usually added in the thin-down tank. Thin-down tanks are usually on a floor below the grinding equipment to take advantage of gravity flow, and the finished paint is usually dropped to a floor below the thin-down tanks for straining and filling.

The coating compositions of this invention are useful for such purposes for which conventional paints are used. For example, these paints are useful as top coats, fillers, primers, surfaces and sealers. The method of drying the coating is not critical, and any conventional process may be used. For example, the coatings of the present invention may be air dried or dried at an elevated temperature. The preferred method of drying is oven baking. While the baking temperature in this process may vary widely, and baking cycle time is reduced with higher baking temperatures, a temperature range of about 80° C. (140° F.) to about 260° C. (500° F.) is preferred. Baking temperatures of about 150° C. (300° F.) for about 10 min are most preferred.

The following examples are provided to illustrate the present invention, but it will be understood that they are intended to be illustrative only and not limitative of the invention.

EXAMPLES

I. Preparation of Coating Composition

The paint formulation for use in the examples below is based upon a suggested formula, available from Cargill, Inc., Carpentersville, Ill., for Cargill White Baking Enamel P-1734-217B.

(1) Preparation of Grind Paste

Using a large bucket with a capacity of about 2 gal for a reaction vessel, a grind paste was prepared by mixing 1671 grams (g) of a binder, Cargill Hi-Solids Polyester 57-5776, and 2573 g of a pigment, TIPURE R-900, available from E.I. Dupont de Nemours, Inc., Wilmington, Del., under moderate agitation with a Cowles disperser.

Agitation was increased to grinding speed, and continued until the particle size of the grind read approximately 6 Hegman, as measured by ASTM D-1210. This Hegman reading indicated that all particles in the grind had an approximate diameter of 25 $\mu$ or less.

About 233.8 g of the grind was then weighed into individual pint cans and cooled.

(2) Letdown

Again employing a reaction vessel with an approximate capacity of 2 gal, 1131 g of the binder, Cargill Hi-Solids Polyester 57-5776, was added under moderate Cowles agitation. The following were subsequently added under continued agitation:

| | |
|---|---|
| Resimene 747 (Cross-Linking Agent, Monsanto) | 792 g |
| Byk 300 (Surface Agent, Mallinkrodt) | 9 g |
| VP-451 (Catalyst, Mallinkrodt) | 64 g |
| Methyl Isoamyl Ketone (Liquid Medium) | 643 g |

The mixture was blended until uniform.

Finally, 146.6 g of this composition was weighed into the individual pint cans of grind paste described above, and blended until uniform.

The resulting paint formulation had a weight per gallon of about 11.86, as measured according to ASTM D-1475.

II. Dispersion or Gel Preparation

To add the rheological modifiers of the present invention to the paint formulation prepared in section I above, a dispersion of the copolymer was prepared.

The dispersions were made at 20% solids. 600 grams of xylene (the liquid medium) was weighed into a 1000 ml, pyrex glass beaker. Then 150 grams of a nylon graft copolymer, available from AlliedSignal, Inc., Morristown, N.J., under the tradename AC®X 413, was weighed into the liquid medium. The mixture was placed on a hot plate under moderate agitation produced by a 211 prop blade and a 1/18 HP Bodine motor (500 RPM MAX).

As the temperature was increased, the copolymer melted into the liquid medium, producing a clear solution at 100° C. The solution was then allowed to cool until the cloud point was reached, approximately 34° C. The cloud point is the temperature where the copolymer precipitates out of solution, and can be determined by the continued further opacity of the blend.

The mixture was then placed back on the hot plate and reheated until it clarified again. The mixture was again allowed to cool; but, beginning at 5° C. above the cloud pt, until 10° C. below the cloud point, the mixture was rapidly cooled (shock cooling). The shock cooling was accomplished by immersing the beaker containing the mixture in an ice bath with continued agitation. During the rapid cooling step, the sides of the beaker were continually scraped with a spatula to prevent the formation of hard, cold gel on the beaker sides. If allowed to remain, this firm gel would drastically slow cooling.

The shock cooling process produced a translucent gel dispersion of fine particles. Once the lower end of the cloud point range was reached, the ice bath was removed, and agitation and scraping continued to room temperature.

Overnight, an increase in the viscosity of the gel was observed, but the gain in viscosity is easily re-broken down with shear.

III. Rheological Additive Addition

To test the effectiveness of the rheology modifier prepared in section II above, it was then added to the paint formulation. A pint can with the weighed grind paste prepared in section I above was placed under moderate shear on the Cowles disperser. The copolymer was then added at a 1% loading based on total formula weight of the coating composition; since the rheological modifier was prepared in a 20% solids dispersion form, 5% on total formula weight of dispersion is added.

The grind paste was brought back up to grinding speed and the temperature was monitored until about 140° F. (60° C.) was attained, and the speed was maintained another 10 minutes for total incorporation. The speed was then lowered to a moderate level and the correct amount of letdown was added under agitation. Blending was continued until the composition was uniform, with constant scraping of the vessel sides. When fully homogenous, the agitation was slowed, and the entrapped air was released from the blend.

The following day, the composition was adjusted for weight per gallon by adding liquid medium, preferably a combination of xylene and/or methyl iso-amyl ketone. The resulting composition had a corrected WPG of 11.86 lbs/gal, as measured by ASTM D-1475.

IV. TESTING (1) High Shear Viscosity—ASTM D-4287

The high shear viscosity of a paint composition is tested on an ICI cone and plate viscometer, and provides an indication of a formula's brushability properties.

A drop of the paint was placed between the two metal plates of the viscometer, and the ability of the composition to be moved under high shear rates is measured. A lower viscosity reading is desirable for ease of application.

(2) Low Shear Viscosity—ASTM D-2196 Method A

Using a Brookfield RVF model synchrolectric viscometer, low shear viscosities were evaluated. This viscosity indicated the stability of the paint at low shear rates (on the shelf at rest). It indicates how homogeneous the paint will remain on the shelf, and provides a measure of the paint's inherent body.

(3) SAG—ASTM D-4400 Method A

Tests were performed on the paint compositions of the present invention using a Leneta 3–12 mil anti-sag bar and Leneta 7B Sag & Levelling drawdown cards.

The card was positioned flat on a vacuum plate and placed under vacuum. The U-shaped drawdown blade was placed at the top of the card, and the coating to be tested was placed between the arms of the blade. The blade was then dragged along toward the bottom of the card with sustained even pressure, to apply lines of paint having a thickness varying from 3 to 12 mils in increments of 1 mil.

The card was then removed from the vacuum plate and suspended vertically with the 3 mil paint thickness line toward the top. The lines of paint were examined to determine the maximum thickness the paint could be applied without running or dripping (sagging).

Next, the card was placed in an oven maintained at a baking temperature of approximately 150° C., again with the 3 mil paint thickness line toward the top. The baking procedure was continued for about 30 min, until dry. The maximum thickness the paint could be applied without running or dripping was recorded. The thicker the paint can be applied without running the better.

(4) Flow—ASTM D-2801

Flow is the antithesis of sag, and indicates how well a paint on a vertical surface will flow to a level, glass-like finish. A balance of sag and flow is desired in many applications.

The flow test results herein were obtained using a New York Paint and Coatings Society (NYPC) 0–10 LEVELING TEST blade and Leneta 7B Sag and Levelling drawdown cards. The test blade contains sets of two adjacent notches in varying depths. The paint was applied to drawdown card with even pressure, and the amount of paint required for the two lines to flow together was evaluated. After the paint is dry, a rating is recorded of 0–10, 10 being the best.

(5) Anti-Settling—ASTM D-869 and ASTM D-1849

As the paint is stored in its container, the denser components (pigments, etc.) will try to settle to the bottom. A good, rheological agent for anti-settling will impede or stop this process; at the very least, it should create a "soft" settle which can easily be re-stirred. Hard compact sediments are very undesirable.

Following a specified length of time on a shelf, the cans are reopened and checked for settling with a flat end spatula. The amount, type and severity of the selling are recorded. Accelerated testing in an oven is also often performed at 120–140° F. for 30 days.

(6) Film Appearance

Using a 0.003"–6" long drawdown bar, a film of paint is applied on the vacuum plate to a Leneta 7B Sag and Levelling Card. After drying overnight, the surface appearance of the coating is checked for grit, non-uniformity, and other defects.

V. RESULTS

The anti-sag and anti-settling properties of the composition prepared as outlined above (identified as Compound C in Table 2 below) were compared to those of a control (Compound A), which contained no rheological additive, and a standard rheological copolymer, (Compound B), available from AlliedSignal, Inc., Morristown, N.J., under the tradename AC®X 629. The results are set forth in the table below.

TABLE 2

| Addi-tive | Total Formula Wt. (%) | Low Shear Viscosity (KU) | Hi-Shear Viscosity (Poise) | Anti-Sag (Mil) | Anti-Settling RT | Anti-Settling 125° C. |
|---|---|---|---|---|---|---|
| A | 0.5 | 74 | 3.5 | <3 | 3½ | |
| B | 0.5 | 84 | 4.75 | <3 | ¼ | |
| C | 0.5 | 81 | 4.1 | <3 | ¼ | |
| A | 1.0 | 69 | 3.8 | 2½ | 3½ | 3¾ |
| B | 1.0 | 81 | 4.7 | 6 | ¼ | 0 |
| C | 1.0 | 93 | 5.5 | 12+ | ¼ | 0 |
| A | 2.0 | | | 5½ | 1 | |
| B | 2.0 | | | 12+ | ¼ | |
| C | 2.0 | | | 12+ | 0 | |

While exemplary embodiments of the invention have been described, the true scope of the invention is to be determined from the following claims.

What is claimed is:

1. An improved coating composition comprising a uniform blend of one or more polymeric binders dispersed in a liquid medium, which liquid medium consists essentially of at least one component selected from the group consisting of water and organic solvents and an anti-sag and anti-settling effective amount of a copolymer comprising a polymeric backbone comprising recurring monomeric units derived from monomers selected from the group consisting of at least one α-olefin and at least one unsaturated carboxylic acid, said backbone having grafted thereto, by a covalent amide linkage, one or more polymeric grafts comprising at least one recurring monomeric unit selected from the group consisting of

—NHC(O)RC(O)NHR₁ and

—NH—R—C(O)— wherein R is an alkylene group of at least 2 carbon atoms, and R₁ is R or aryl.

2. The coating composition as recited in claim 1, wherein said polymeric graft comprises recurring monomeric units represented by the formula:

—NH—R—C(O)— wherein R is an alkylene group with about 6 to about 12 carbon atoms.

3. The coating composition as recited in claim 2, wherein R is an alkylene group with 6 carbon atoms.

4. The coating composition as recited in claim 1, wherein said polymeric graft comprises recurring monomeric units represented by the formula:

—NHC(O)RC(O)NHR₁ wherein R and R₁ may be the same or different, and R is an alkylene group with about 6 to about 12 carbon atoms.

5. The coating composition as recited in claim 1, wherein said polymeric graft comprises recurring monomeric units represented by the formula:

—NHC(O)RC(O)NHR₁ wherein R and R₁ are each an alkylene group with about 6 to about 12 carbon atoms.

6. The coating composition as recited in claim 1, wherein said α-olefin is selected from the group consisting of ethylene and propylene.

7. The coating composition as recited in claim 1, wherein said carboxylic acid is an (α,β-ethylenically unsaturated carboxylic acid selected from the group consisting of acrylic acid, methacrylic acid, crotonic acid, maleic acid, fumaric acid, and mixtures thereof.

8. The coating composition as recited in claim 1, wherein said carboxylic acid is acrylic acid.

9. The coating composition as recited in claim 1, wherein said at least one or more polymeric grafts are present in said copolymer in an amount of from about 10 to about 30 weight percent based on the total weight of the copolymer.

10. The coating composition as recited in claim 1, wherein said at least one or more polymeric grafts are present in said copolymer in an amount of from about 0.1 to about 10 weight percent of the copolymer.

11. The coating composition as recited in claim 1, wherein the copolymer is comprised of about 65 to about 98 mol percent of the α-olefin and about 2 to about 35 mol percent of the unsaturated carboxylic acid.

12. The coating composition as recited in claim 1, wherein said copolymer is present in an amount of from about 0.5% to about 2% by weight, based on the total weight of the composition.

13. The coating composition as recited in claim 1, wherein said composition has a low shear viscosity of about 3000 to about 5000 cps at a temperature of 20° C., as measured according to ASTM D-2196 Method A.

14. The coating composition as recited in claim 1, wherein said composition has a high shear viscosity of about 500 to about 2000 cps at a temperature of 20° C., as measured according to ASTM D-4287.

15. The coating composition as recited in claim 1, wherein the composition has a sag resistance of at least 12 mils, as measured according to ASTM D-4400 Method A, when dried at a temperature of 150° C.

16. The coating composition as recited in claim 1, wherein the composition has a sag resistance at least 100% greater than a composition without said copolymer, as measured according to ASTM D-4400 Method A.

17. The coating composition as recited in claim 1, wherein said composition exhibits a rate of settling at least 300% less at room temperature than a composition without said copolymer, as measured according to ASTM D-869.

18. The coating composition as recited in claim 1, wherein said composition further comprises a pigment.

19. The coating composition as recited in claim 1, wherein said binder is a polyester melamine baking coating.

20. The coating composition as recited in claim 1, wherein said liquid medium is methyl iso-amyl ketone.

21. An improved coating composition which comprises a uniform blend of a pigment and one or more polymeric binders dispersed in a liquid medium, which medium consists essentially of at least one of water and an organic solvent, wherein the improvement comprises uniformly blended therein an anti-sag and anti-settling effective amount of a copolymer comprising a polymeric backbone comprising recurring monomeric units derived from monomers selected from the group consisting of ethylene and acrylic acid, said backbone having grafted thereto, by a divalent amide linkage, one or more polymeric grafts comprising units derived from aminocaproic acid.

22. The coating composition as recited in claim 21, wherein said copolymer is present in an amount of from about 0.5% to about 2.0% by weight, based on the total weight of the composition.

23. A coating composition, comprising a uniform blend of:

(a) one or more polymeric binders dispersed in a liquid medium, which liquid medium consists essentially of at least one of water and an organic solvent;

(b) a pigment;

(c) from about 0.5 to about 2.0% by weight of a copolymer comprising a polymeric backbone comprising recurring monomeric units derived from monomers selected from the group consisting of ethylene and acrylic acid, said backbone having grafted thereto, by a covalent amide linkage, one or more polymeric grafts comprising units derived from aminocaproic acid, wherein said composition has a sag resistance of at least 12 mils, as measured according to ASTM D-4400 Method A, when dried at a temperature of about 150° C.

24. A coating composition, comprising a uniform blend of:

(a) one or more polymeric binders dispersed in a liquid medium, which liquid medium consists essentially of at least one of water and an organic solvent;

(b) a pigment;

(c) from about 0.5 to about 1.0% by weight of a copolymer comprising a polymeric backbone comprising recurring monomeric units derived from monomers selected from the group consisting of ethylene and acrylic acid, said backbone having grafted thereto, by a divalent amide linkage, one or more polymeric grafts comprising aminocaproic acid, wherein said composition has a low shear viscosity of about 3000 to about 5000 cps, as measured according to ASTM D-2196 Method A, and a high shear viscosity of about 500 to about 2000 cps, measured according to ASTM D-4287, wherein said composition has a sag resistance of at least 12 mils, measured according to ASTM D-4400 Method A, when dried at a temperature of about 150° C., and wherein said composition exhibits at a rate of settling at least 300% less at room temperature than a composition without said copolymer, as measured according to ASTM D-869.

* * * * *